Feb. 18, 1947.   G. T. LAMPTON ET AL   2,416,103
DE-ICING COMPOSITION
Filed Oct. 30, 1943
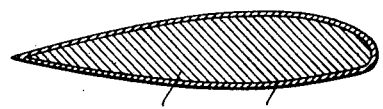
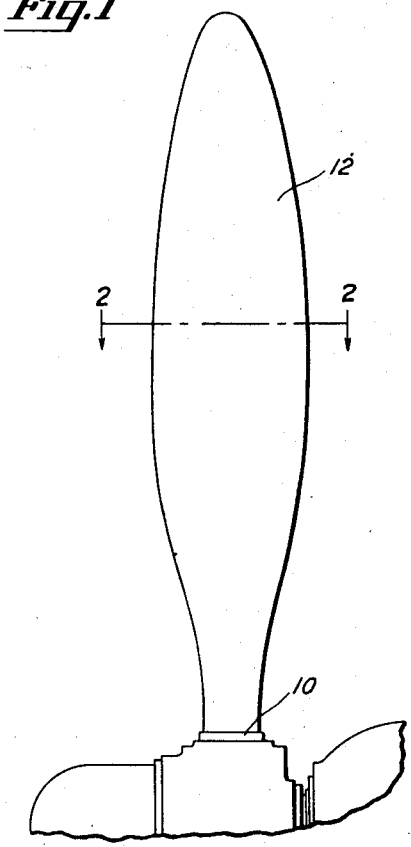
INVENTOR
Glen T. Lampton
Howard L. Vasbinder
BY   Theodore A. Dissel
Charles L. Shelton
ATTORNEY.

Patented Feb. 18, 1947

2,416,103

UNITED STATES PATENT OFFICE 2,416,103

DEICING COMPOSITION

Glen T. Lampton, West Hartford, Conn., Howard L. Vasbinder, White Plains, N. Y., and Theodore A. Dissel, Hartford, Conn., assignors to United Aircraft Corporation, East Hartford, Conn., a corporation of Delaware Application October 30, 1943, Serial No. 508,274

27 Claims. (Cl. 244—134)

This invention relates to a means for preventing the accretion of ice on aircraft surfaces. This application is a continuation-in-part of application Serial No. 476,420, filed February 19, 1943.

An object of this invention is to provide an improvement in a de-icing paint for application to aircraft parts or accessories, such as propellers, rotors, wings, antennae masts, etc.; and to provide an improved means and method for protecting aircraft for extended flight periods against failures or crashes caused by too great an accumulation of ice on the operating surfaces of the aircraft.

Other objects and advantages will be apparent from the specification and claims, and from the accompanying drawing of what is now considered to be a preferred embodiment of the invention.

In the drawing:

Fig. 1 is a schematic view showing an aircraft propeller blade 10 provided with a de-icing coating 12.

Fig. 2 is a sectional view along the line 2—2 of Fig. 1.

In our prior application Serial No. 476,420, filed February 19, 1943, we have disclosed a means and method for preventing the accumulation and retention of a deleterious thickness of ice on aircraft surfaces such as airfoils, and particularly rotating airfoils.

As disclosed in the cited prior application a coating or paint is applied to the surface to be protected, said coating being of a nature to reduce the forces with which ice formed on the surface adheres thereto. The strength of the bond between the ice and the aircraft surface is sufficiently reduced so that any ice that forms thereon will be thrown off by separating forces, such as the centrifugal force acting on an aircraft propeller.

The de-icing paint or coating may be applied to the aircraft part prior to flight and preferably has a composition such as to set up a metal organic saline solution at the interface of the protective coating and any ice which may form thereon. Thus, a liquid or lubricating film or interface of low shear strength is maintained between the coating and the ice thereon so that vibrational, aero-dynamic, centrifugal, and other forces acting on the aircraft part during flight conditions will be so large in comparison to the strength with which the ice adheres to the coating as to insure its removal, by being thrown off before it reaches a damaging thickness.

The preferred composition of the paint or coating comprises a wetting agent, and a freeze point depressing material. A vehicle or binder is used to retain these materials as a coating on the aircraft part to be protected against icing.

While the proportions of these ingredients may be varied over a wide range without rendering the coating inoperative as a protection against ice, the following proportions constitute an effective mixture. To a cellulose nitrate cement, commercially known as "Ambroid," using 49 parts in 100 of this solution by weight, is added 14 parts of commercial lacquer, 35 parts of an organic wetting agent, such as dioctyl sodium sulfo succinate, and the balance of approximately a 50% solution of an inorganic or metal organic salt in alcohol. The wetting agent, dioctyl sodium sulfo succinate, is commercially known as "Aerosol O. T." In this reagent the metal ion sodium may be replaced with other metal ions such as calcium, barium, or zinc, and will then exhibit different de-icing behavior. Many other wetting agents of entirely different chemical structure are both commercially available and suitable and hence the composition is not limited to any specific wetting agent. Other salts, such as sodium chloride and calcium chloride, will also depress the freezing point of water or when contacted with a snow or ice crystal will transform it into the liquid phase; hence, the composition is not limited to any specific freeze depressant. Potassium acetate has advantages as a freeze depressant because it is soluble in the same solvents as the matrix and is also soluble in water. A freeze point depressant having a common metal ion with the wetting agent, such as magnesium chloride and magnesium "O. T." may be used and has the advantage of reducing precipitation problems which sometimes occur as a result of a reaction between the wetting agent and the freeze depressant. By the term "wetting agent" we refer to substances which rapidly reduce interfacial tension between two surfaces to be wetted.

For the purpose of illustration only, the following ingredients and proportions are given as examples of mixes that have been found to constitute effective de-icing coating compositions:

EXAMPLE I

| Ingredients | Parts by weight |
|---|---|
| "Ambroid" | 60 |
| Commercial lacquer | 18 |
| Magnesium "O. T.": | |
| 25% alcohol | } 48 |
| 25% dope thinner | |
| Magnesium chloride | 8 |
| Commercial dope thinner | 25 |

EXAMPLE II

| Ingredients | Parts by weight |
|---|---|
| "Ambroid" | 85 |
| Commercial lacquer | 25 |
| Barium "O. T.": 50% alcohol | 60 |
| Potassium acetate | 4 |
| Commercial dope thinner | 35 |

EXAMPLE III

| Ingredients | Parts by weight |
|---|---|
| "Ambroid" | 60 |
| Commercial lacquer | 21 |
| Aluminum "O. T.": 7% water | 14.5 |
| Alcohol | 14.5 |
| Potassium acetate | 5 |
| Commercial dope thinner | 20 |

Ambroid is a well-known commercial cement having a cellulose nitrate base with small amounts of plasticizer and/or resins. Commercial lacquers conventionally contain cellulose nitrate or cellulose acetate, natural and artificial resins, ester gum, etc., which serve as bases; plasticizers or softeners such as amyl, ethyl, or butyl phthalates, castor oil; and solvents such as alcohol, ethyl acetate, butyl acetate, butylol, benzol, toluol. Commercial dope thinners contain ethyl acetate, butanol, petroleum spirits, and butyl acetate.

In preparing the paint, the wetting agent and freeze depressant are mixed with the vehicle into a homogeneous mass. Other ingredients such as a drying agent or a solvent may be included if desired. The paint is then applied, for instance by spray gun or brush, in one or more coats and allowed to harden. According to one method of application, the length of time a single coat will protect against icing conditions is determined by experiment and then a sufficient number of coats are applied to furnish de-icing protection over the necessary period of time. For instance, if one coat is found to afford protection for one hour during flight under icing conditions, then twelve coats would be applied to supply protection for approximately a twelve-hour flight. Each coat might be only 0.001" thick but by applying a number of coats the finish may be built up to a thickness sufficient to afford the necessary protection. The nature of the composition is such that it affords excellent protection against icing yet may be applied as a coating which does not appreciably affect the physical and aerodynamic properties of an airfoil.

Our de-icing paint has been proved by test to be operative and practical, and we do not wish to be limited to any particular theory of operation.

However, it is believed that the wetting agent performs the major de-icing function by providing a slippery surface when wet, and also by aiding in the depression of the freezing point. If the impingement of the water from the atmosphere upon the aircraft surface is discontinued, the wetting agent may freeze and thereafter malfunction when newly exposed to icing conditions. This objection is obviated by adding a freeze depressant which will reduce the ice to water, and thus present a slippery wet surface to icing conditions later encountered. The freeze depressant acts with the wetting agent to insure a liquid film at the interface of the ice and the protective coating during impingement of ice or water on the surface at temperatures below the freezing point of water. While the chemical reactions are not definitely known, it is thought that evaporation of the solvents in the vehicle or binder after the coating is applied leaves the wetting agent and the freeze depressant in solid solution in a relatively hard, horny matrix. When wet with water, the wetting agent goes into aqueous solution and provides a slippery surface to which the ice cannot strongly adhere, and also reduces the surface tension of the water and causes it to spread into intimate contact with the freeze depressant, such as potassium acetate, which will go into aqueous solution and depress the freezing point at the interface. If the water impinging on the aircraft surface is in the solid phase such as ice or snow, then the freeze depressant as well as the wetting agent will act to reduce it to the liquid phase at the interface with the same result as mentioned immediately above.

It is desired that the ice shall accumulate on the blade or airfoil surface to an appreciable thickness, such as approximately $\frac{1}{16}$", before it is thrown off. This thickness is not sufficiently great to produce any serious adverse aerodynamic effect and it has the advantage of protecting the chemical paint from the leaching action of the impinging water during such time as the ice is present on the surface, thus extending the effective life of the coating.

The proportions given herein may be varied over a wide range and yet be still effective as a protection against ice. By changing the proportions, mixtures of greater chemical de-icing activity but of lesser resistance to erosion and deterioration from the action of rain which may occur prior to icing conditions, or the converse thereof, may be obtained. If desired the ingredients of the de-icing coating may be so selected as to render the same transparent, such as where it is to be used on a transparent surface, or it may be pigmented, for instance by adding carbon black or a colored pigment and aluminum stearates, for the purpose of making the coating black or colored. The coating may be made flexible, as by selecting a vehicle which is flexible in its hardened condition, for use on surfaces such as rubber de-icer boots.

Wetting agents as a class are all, so far as is now known, operative in the sense that they will act as de-icing agents when utilized in the manner disclosed above. However, while wetting agents in general are better than freeze depressants per se or greases, etc., we have found that particular types of wetting agents are much more effective and commercially valuable than other wetting agents, and certain freeze depressants and vehicles are much more suitable than others.

We have discovered that those wetting agents which are organic compounds containing a radicle composed of a salt of an inorganic polybasic acid are particularly valuable in de-icing compositions or paints in that they provide an effective de-icing action and yet have a high endurance when used with the proper vehicles. Those wetting agents which are salts of sulfated or sulfonated acids, alcohols, or fatty acid amides and esters are exceptionally effective; while still better for some purposes are the wetting agents which are of salts of sulfonated aromatics, or salts of sulfonated alcoholic esters and acids. Of these groups, the wetting agents, commercially known as Aerosols, are both commercially available and particularly suited for the purposes specifically noted herein; salts of sulfonated esters of dicarboxylic acids, such as the Aerosol O. T.'s, provide extremely effective de-icing action with long de-icing life, and barium O. T., or dioctyl barium sulfo succinate provides exceptionally long life and a desirable de-icing cycle.

The fact that the Aerosol O. T.'s are solids at working temperatures (the temperatures encountered by aircraft propellers etc. during aircraft operation) is important. Being solids, Aerosol O. T.'s are readily retained in a hardened vehicle or similar retaining means on the surface of the propeller and will not be thrown off by the exceptionally high centrifugal force encountered during propeller operation. While a liquid wetting agent would de-ice for a short period of time and thus might be considered operative, a liquid, even though a wetting agent, would not be commercially effective for any extended period of time.

The extremely low water solubility of the Aerosols in relation to their extremely high wetting power is also considered an important factor in producing a commercially practicable de-icing paint. Rain or ice impinging on the propeller blade during flight would rapidly leach out a wetting agent of relatively high water solubility and thus would render the de-icing paint ineffective within a relatively short period of time, not sufficient for the length of flight encountered in present day normal operating practice. Thus, the mere fact that a wetting agent may be of relatively high wetting power would not make it the best ingredient for our paint. The agent should not only have a high spreading or wetting power but should also be of quite low water solubility. If it were otherwise, the de-icing paint, while effective for a short period of time, would lose its effectiveness while the aircraft was in flight and this would be even more dangerous to the pilot and passengers than would no de-icing paint at all, because the pilot might be lulled into a false sense of security by thinking that he was flying with de-icing protection whereas, in actual point of fact, he might have none.

The wetting agent for our paint should be so chosen so as to have a relatively high wetting power, yet the agent with the highest wetting power is not necessarily the best wetting agent for our de-icing paint. Thus, we contemplate that the best balance between de-icing effectiveness and de-icing endurance is effected by providing for the accretion of ice on the propeller blade or similar surface up to a predetermined approximate ice thickness which is not deleterious or dangerous to the operation of the aircraft. This periodic or cyclic ice removal can be varied in time or frequency by varying the ingredients and the proportions of our composition. A composition comprising barium O. T., a freeze depressant and cellulose nitrate or a similar vehicle has a de-icing cycle that is particularly suitable for propeller blades.

The rapidity with which the paint de-ices may be varied by using wetting agents of different wetting powers as well as by other factors, and the ingredients and proportions of the mix are selected to govern the rapidity of de-icing action of the paint so that the ice is not thrown from the propeller immediately as it forms thereon; rather it is allowed to accumulate as a glaze or as a thin coat, until its mass is sufficient to result in a separating force sufficient to overcome the strength of the bond between the ice and the airfoil surface, through the film or interface of low adherent strength set up by the chemical paint. By this intermittent or periodical removal, the chemical paint is protected from leaching, or from erosion by the airstream, except during the period after an accumulation of ice has been thrown off the surface and before a new coat of ice has formed. By this intermittent de-icing process the effective life of the chemical paint, including the wetting agent, may be considerably increased and we have found may be extended to cover periods considerably in excess of even the longest range flights now being made.

We have found that the above desirable characteristics are preferably provided by utilizing an Aerosol as the wetting agent in our composition, and in particular the barium Aerosol, dioctyl barium sulfo succinate. This compound has a very high wetting power, or a very low sinking time as determined by the Draves test (this test measures the varying times that standard skeins of cotton yarn require to sink in different concentrations of aqueous solutions of wetting agents), and yet at the same time has an extremely low water solubility as compared with other commercially known wetting agents of either higher or lower wetting power.

The vehicle or carrier is preferably one of the many commercial vehicles, for instance, we have found a cellulose nitrate vehicle, such as Ambroid, to be satisfactory. This vehicle may be used in combination with similar vehicles containing plasticizers, such as are used in commercial lacquers. Other vehicles we have found particularly suitable are cellulose acetate, ethyl cellulose, vinyl resins such as polyvinyl butyral and polyvinyl acetate, and alkyd resins (such as Glyptal, Rezyl, Neolyn), modified with either drying or non-drying oils. In general the vehicle should be one commercially available and which will form a hard, smooth, erosion-resistant, corrosion-resistant, and water-resistant surface of great mechanical strength and which does not impair the aero-dynamic characteristics of the airfoil. The vehicle is preferably one that may, by the use of solvents, be applied as a liquid but which will harden and become rigid as the solvents evaporate or dry to form a de-icing surface which is of less hardness than the surface on which the composition is applied; yet which is relatively hard and rigid as compared with pastes or greases; and which will gradually erode off or wear away as the periodic de-icing action proceeds so as to present a fresh, active surface to icing conditions after each ice removal occurs. The hardened vehicle must also have sufficient adherent and coherent strength to stay on the protected surface under working conditions; otherwise, it might be stripped off with the ice as the ice is removed.

As the de-icing paint may be used on a surface having a permanent lacquer or paint finish, it may be desirable to select a vehicle that will not affect the underlying finish, so that the de-icing paint may be put on and taken off without affecting the permanent finish of the aircraft part. For this purpose the following mix has been found particularly effective, particularly because it not only does not affect the conventional permanent finish normally used on aircraft propellers but may also be removed with a solvent such as 100 octane gasoline, which does not affect the permanent finish and which is normaly available where aircraft are serviced.

No. 966 de-icing lacquer

| | Parts by weight |
|---|---|
| Carbon black | 0.35 |
| S. S. nitrocellulose | 4.84 |
| Dioctyl barium sulfo succinate | 19.50 |
| Blown or gelled castor oil | 8.26 |
| Urea | 0.62 |
| Barium thiocyanate | 2.74 |
| Aromatic solvent (such as: toluene, xylene) | 32.72 |
| Alcohols | 27.86 |
| Esters (such as: ethyl acetate, butyl acetate) | 3.11 |

The following specific mixes are also particularly valuable for the purposes noted:

D-4 for propellers, rotor blades, spinners, cooling fans or blowers, struts, etc.

| | Parts by weight |
|---|---|
| Dioctyl barium sulfo succinate | 46.82 |
| Alcohols | 39.00 |
| Aromatic solvent | 6.60 |
| Barium thiocyanate | 6.60 |
| Urea | 0.98 |
| | 100.00 |

HSP #115 (propellers)

| | Pounds |
|---|---|
| No. 2477 Glyptal solution (65% alkyd resin) (Genl Elect) | 3.62 |
| Barium O. T. (75% in xylol) | 3.13 |
| Potassium ethyl phosphate | 0.56 |
| Benzol | 0.94 |
| | 8.25 |

H viscosity Gardner-Holt scale.

#785 (propellers, rotor blades, etc.)

| | Pounds |
|---|---|
| R5364 clear dope (Monsanto) | 2.470 |
| Pratt & Lambert lacquer (clear gloss onto finish) | 0.740 |
| Barium O. T. (75%) | 1.320 |
| Barium thiocyanate, crystalline | 0.150 |
| Urea | 0.041 |
| Dibutyl phthalate | 0.167 |
| Dope thinner (An-TT-T-256) | 2.900 |
| | 7.608 |

H viscosity Gardner-Holt scale.

Barium thiocyanate, referred to in the mixes specifically listed above, has unusual advantages as a freeze depressing agent. It has a common metal ion with the preferred wetting agent barium O. T. and thus obviates precipitation problems which might otherwise be encountered when the de-icing mix is prepared. Urea is desirable in that it apparently hastens the de-icing action of the paint. Other plasticizers than the castor oil disclosed in No. 966 may be used, as well as other pigments than the carbon black specifically mentioned.

The freeze depressant salt is preferably selected not only for its effectiveness as a freeze depressant per se, and not only to reduce precipitation problems in preparing the mix, but also for its action, in combination with the particular wetting agent disclosed, in increasing the wetting power and effectiveness of the said wetting agent. It should also be soluble in the same solvent as the wetting agent and the vehicle base. The freeze depressant may also be selected for its wetting power, and thus will perform both the functions of wetting and freeze point depressing. For instance, alkyl phosphoric acid salts may be used for this purpose.

While it is within the scope of this invention to use various freeze depressants or metal salts with our preferred wetting agent, we prefer in some instances to use those freeze depressants which act to increase the effectiveness of the particular wetting agent used. Some electrolytes when used in combination with the Aerosols, provide increased wetting power as compared with the wetting power of the wetting agent per se, and it is within the scope of this invention (on the basis of the foregoing guides and instructions) to select, within the skill of the art, a particular freeze depressant which will increase the wetting power of the particular wetting agent used in our de-icing paint.

The specific wetting agent, freeze depressant, and vehicle should each be so selected in relation to each other as to provide a composition which will be resistant to excessive moisture absorption and hydrolysis in the hardened condition. Thus, in some vehicles, such as rubber, Aerosol O. S., or iso-propyl naphthalene sodium sulfonate, is preferred; while in other vehicles, such as cellulose nitrate, barium O. T., or dioctyl barium sulfosuccinate, is preferred. The hardened coating should present a de-icing surface which is sufficiently resistant under conditions encountered in flight as to provide a long de-icing life, yet the surface must be sufficiently active to effectively perform its de-icing function. This may be done by utilizing wetting agents of higher solubility with some vehicles (as Aerosol O. S. in rubber) and wetting agents of lower water solubility for other vehicles (such as Aerosol O. T. in resin vehicles), as well as by varying other factors in the mix.

Our de-icing composition is specifically disclosed herein as a paint or coating which is applied as a liquid (for instance, by brushing, spraying or dipping), and which then is allowed to harden or is hardened to provide a hard, solid, smooth surface on the part to be protected. However, the wetting agent or the wetting agent and freeze depressant may also be milled, molded, cast, impregnated or otherwise introduced into or formed integrally with the propeller blade, rubber de-icing boot, or similar part to be protected, to form in effect an integral protection for the part. In such instances, the part itself acts as the vehicle and no coating or paint in the usual sense is present, though the surface presented to icing conditions includes the de-icing agent or agents and hence is a de-icing surface.

Additional ingredients may be used in our composition, for special purposes. For instance, a pigment or similar ingredient which is electrically conducting may be added to provide for the passage of an electrical current through the paint, thus providing heat at the ice-paint interface for facilitating the formation and maintainance of the liquid film or slippery interface between the ice and the surface protected. Waxes or metal soaps may be included.

R5364 clear dope is:

| | Per cent |
|---|---|
| R. S. nitrocellulose 15-20 sec | 15-16 |
| Plasticizer | 4-5 |
| Camphor | 0-1 |
| Solvents | 78-81 |

2477 Glyptal is:

| | Per cent |
|---|---|
| Alkyd resin modified with castor oil acids | 65 |

This resin is a non-brittle solid composed of:

| | | |
|---|---|---|
| Phthallic anhydride | per cent | 35 |
| Castor oil acids | do | 45 |
| Specific gravity of resin | do | 1.13 |
| Acid number of resin | do | 6-9 |
| Rosin derivatives | | None |
| Phenolic compounds | | None |

35% xylol (20°)

| | |
|---|---|
| Viscosity | 1500-2000 McMichael |
| Sp. gr. of solution | 1.030 |
| Acid number (of solution) | 4-6 |

Neolyn, Rezyl and Glyptal are alkyd resins which are made by the reaction of polyhydric alcohols with polybasic acids and modified, if desired, by the addition of drying or non-drying oils or their fatty acids during the reaction. Neolyn is the trade name for Hercules Powder Company's alkyd resins. Rezyl is the trade name for American Cyanamid Company's alkyd resins. Glyptal is the trade name for General Electric Company's alkyd resins.

It is to be understood that the invention is not limited to the specific embodiment herein illustrated and described, but may be used in other ways without departure from its spirit as defined by the following claims.

We claim:

1. A de-icing paint comprising a substantially water insoluble vehicle dissolved in a volatile organic solvent, and a water freeze point depressant salt of relatively high water solubility and a wetting agent of relatively low water solubility homogeneously dispersed therein, said wetting agent being selected from the group consisting of salts of sulphated acids, salts of sulphonated acids, salts of sulphated alcohols, salts of sulphonated alcohols, salts of sulphated fatty acid amides, salts of sulphonated fatty acid amides, salts of sulphated fatty acid esters, and salts of sulphonated fatty acid esters, said wetting agent being present in substantial amount sufficient to lower the adhesion between ice on the surface of said paint and said paint.

2. A de-icing composition comprising as de-icing ingredients dioctyl barium sulfo succinate as a wetting agent constituting the major ingredient, barium thiocyanate as a water freeze point depressant, and urea as a de-icing accelator.

3. A de-icing coating composition comprising a nitro cellulose base vehicle, and a de-icing agent comprising a salt of a sulphonated ester of a di-carboxylic acid homogeneously dispersed in said vehicle in an amount by weight which is not substantially less than the weight of said vehicle.

4. A de-icing coating composition comprising a resin base vehicle, and a de-icing agent comprising a salt of a sulphonated ester of a dicarboxylic acid homogeneously dispersed in said vehicle in an amount by weight which is not substantially less than the weight of said vehicle.

5. A de-icing coating composition comprising an alkyd resin base vehicle and a de-icing agent comprising dioctyl barium sulfo succinate and a water freeze point depressant salt homogeneously dispersed in said vehicle, said succinate being present in an amount by weight which is not substantially less than the weight of said vehicle and which exceeds the weight of the freeze depressant.

6. A coating composition comprising approximately equal amounts by weight of a water freeze point depressant salt and nitro cellulose, and a wetting agent in an amount exceeding the weight of said nitro-cellulose, said wetting agent being selected from the group consisting of salts of sulphated acids, salts of sulphonated acids, salts of sulphated alcohols, salts of sulphonated alcohols, salts of sulphated fatty acid amides, salts of sulphonated fatty acid amides, salts of sulphated fatty acid esters, and salts of sulphonated fatty acid esters.

7. A coating composition comprising a water freeze point depressant salt and a substantially water insoluble vehicle, and a wetting agent in an amount approximately equal to or exceeding the weight of said vehicle, said wetting agent being selected from the group consisting of salts of sulphated acids, salts of sulphonated acids, salts of sulphated alcohols, salts of sulphonated alcohols, salts of sulphated fatty acid amides, salts of sulphonated fatty acid amides, salts of sulphated fatty acid esters, and salts of sulphonated fatty acid esters.

8. A coating composition comprising a water freeze point depressant salt, a substantially water insoluble vehicle, and a wetting agent, said wetting agent being selected from the group consisting of salts of sulphated acids, salts of sulphonated acids, salts of sulphated alcohols, salts of sulphonated alcohols, salts of sulphated fatty acid amides, salts of sulphonated fatty acid amides, salts of sulphated fatty acid esters, and salts of sulphonated fatty acid esters, said wetting agent being present in substantial amounts sufficient to lower the adhesion between ice on the surface of said composition and said composition.

9. A liquid coating composition comprising dioctyl barium sulfo succinate about twenty parts by weight, barium thiocyanate about three parts by weight, nitro cellulose about five parts by weight, and a solvent for said vehicle, said parts being based on about one hundred parts of the composition by weight.

10. A liquid coating composition comprising dioctyl barium sulfo succinate about fifty percent by weight, barium thiocyanate about seven per cent by weight, urea about one percent by weight, and a solvent for said succinate.

11. A liquid coating composition comprising an alkyd resin base vehicle about two and a half parts by weight, dioctyl barium sulfo succinate about two and a half parts by weight, potassium ethyl phosphate about one half parts by weight, and a solvent for said vehicle, said parts being based on about eight parts of the composition by weight.

12. In an aircraft part, a surface portion comprising a substantially water insoluble vehicle and de-icing material comprising a wetting agent homogeneously dispersed in said vehicle in substantial quantity sufficient to de-ice said surface portion under working icing conditions, said wetting agent being selected from the group consisting of salts of sulphated acids, salts of sulphonated salts, salts of sulphated alcohols, salts of sulphonated alcohols, salts of sulphated fatty acid amides, salts of sulphonated fatty acid amides, salts of sulphated fatty acid esters, and salts of sulphonated fatty acid esters.

13. In an aircraft part, a surface portion comprising a substantially water insoluble vehicle and de-icing material comprising a water freeze point depressant salt and a wetting agent homogeneously dispersed in said vehicle in substantial quantity sufficient to de-ice said surface under working icing conditions, said wetting agent being selected from the group consisting of salts of sulphated acids, salts of sulphonated acids, salts of sulphated alcohols, salts of sulphonated alcohols, salts of sulphated fatty acid amides, salts of sulphonated fatty acid amides, salts of sulphated fatty acid esters, and salts of sulphonated fatty acid esters.

14. The combination of claim 12, in which said part is a rotatable airfoil or propeller.

15. The combination of claim 13, in which said part is a rotatable airfoil or propeller.

16. The combination of claim 13 in which said freeze point depressant salt comprises barium thiocyanate.

17. The combination of claim 13, in which said freeze point depressant salt comprises potassium acetate.

18. The combination of claim 13, in which said freeze point depressant salt comprises potassium ethyl phosphate.

19. The combination of claim 12, in which said surface portion is in the form of a coating on said part.

20. The combination of claim 13, in which said surface portion is in the form of a coating on said part.

21. A de-icing paint comprising a resin base vehicle, potassium ethyl phosphate as a water freeze point depressant, and dioctyl barium sulfo succinate as a wetting agent, said wetting agent being present in a substantial amount sufficient to lower the adhesion between ice on the surface of said paint and said paint.

22. A de-icing paint comprising a nitro-cellulose base vehicle, barium thiocyanate as a water freeze point depressant, and dioctyl barium sulfo succinate as a wetting agent, said wetting agent being present in a substantial amount sufficient to lower the adhesion between ice on the surface of said paint and said paint.

23. In an aircraft part, a surface portion comprising a substantially water insoluble vehicle and de-icing material comprising a wetting agent homogeneously dispersed in said vehicle in substantial quantity sufficient to de-ice said surface portion under working icing conditions, said wetting agent comprising a salt of a sulphonated ester of a dicarboxylic acid and constituting approximately fifty per cent or more of said surface portion.

24. In an aircraft part, a surface portion comprising a substantially water insoluble vehicle and de-icing material comprising a water freeze point depressant salt and a wetting agent homogeneously dispersed in said vehicle in substantial quantity sufficient to de-ice said surface under working icing conditions, said wetting agent comprising a salt of a sulphonated ester of a dicarboxylic acid and constituting approximately fifty percent or more of said surface portion.

25. In an aircraft part, a surface portion comprising a substantially water insoluble vehicle and de-icing material comprising a wetting agent homogeneously dispersed in said vehicle in substantial quantity sufficient to de-ice said surface portion under working icing conditions, said vehicle comprising nitro-cellulose and said wetting agent comprising dioctyl barium sulfo succinate.

26. In an aircraft part, a surface portion comprising a substantially water insoluble vehicle and de-icing material comprising a wetting agent homogeneously dispersed in said vehicle in substantial quantity sufficient to de-ice said surface portion under working icing conditions, said vehicle comprising a resin and said wetting agent comprising dioctyl barium sulfo succinate.

27. In an aircraft part, a surface portion comprising a substantially water insoluble vehicle and de-icing material comprising a wetting agent homogeneously dispersed in said vehicle in substantial quantity sufficient to de-ice said surface portion under working icing conditions, said vehicle comprising rubber and said wetting agent comprising iso-propyl naphthalene sodium sulphonate.

GLEN T. LAMPTON.
HOWARD L. VASBINDER.
THEODORE A. DISSEL.

REFERENCES CITED

The following references are of record in the file of this patent:

UNITED STATES PATENTS

| Number | Name | Date |
|---|---|---|
| 2,342,641 | Cassel | Feb. 29, 1944 |
| 2,292,097 | Vollmer | Aug. 4, 1942 |
| 2,176,423 | Jaeger | Oct. 17, 1939 |
| 2,101,472 | Kormann | Dec. 7, 1937 |
| 1,931,368 | Amberson | Oct. 17, 1933 |
| 1,900,540 | Broderick | Mar. 7, 1933 |
| 2,365,297 | Schweizer | Dec. 19, 1944 |
| 2,357,276 | Wachter | Aug. 29, 1944 |
| 2,346,891 | Adlington | Apr. 18, 1944 |
| 2,328,540 | Hochwalt | Sept. 7, 1943 |

FOREIGN PATENTS

| Number | Country | Date |
|---|---|---|
| 539,312 | British | Sept. 14, 1941 |

OTHER REFERENCES

Draper, Aircraft De-Icing Paint, pp. 10, 11, 13 and 15 in National Paint Bulletin, Sept. 1942.

Parkes & Mellor, Mellor's Modern Inorganic Chemistry, pp. 156–157, 1939.

Industrial Chemist, June 1932, pp. 223–224.

Certificate of Correction

Patent No. 2,416,103.  February 18, 1947.

GLEN T. LAMPTON ET AL.

It is hereby certified that error appears in the printed specification of the above numbered patent requiring correction as follows: Column 10, line 73, claim 12, for "salts" after the syllable "nated" read *acids*; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*